United States Patent
Gimenez Palop et al.

(10) Patent No.: US 10,296,272 B2
(45) Date of Patent: May 21, 2019

(54) PRINTED DOCUMENT INCLUDING MACHINE-READABLE MARK INCLUDING UNIQUE IDENTIFICATION UNDER WHICH METADATA FOR DOCUMENT IS STORED IN REPOSITORY

(71) Applicant: Hewlett-Packard Development Company, Houston, TX (US)

(72) Inventors: Galo Gimenez Palop, Boise, ID (US); Randy Grohs, Star, ID (US); Shell S Simpson, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 24 days.

(21) Appl. No.: 15/521,861

(22) PCT Filed: Oct. 31, 2014

(86) PCT No.: PCT/US2014/063499
§ 371 (c)(1),
(2) Date: Apr. 25, 2017

(87) PCT Pub. No.: WO2016/069006
PCT Pub. Date: May 6, 2016

(65) Prior Publication Data
US 2017/0242641 A1 Aug. 24, 2017

(51) Int. Cl.
*G06F 3/12* (2006.01)

(52) U.S. Cl.
CPC .......... *G06F 3/1265* (2013.01); *G06F 3/1204* (2013.01); *G06F 3/1267* (2013.01); *G06F 3/1268* (2013.01); *G06F 3/1275* (2013.01); *G06F 3/1285* (2013.01)

(58) Field of Classification Search
CPC .... G06F 3/1265; G06F 3/1285; G06F 3/1275; G06F 3/1204; G06F 3/1267; G06F 3/1268
See application file for complete search history.

(56) References Cited

U.S. PATENT DOCUMENTS

| | | | |
|---|---|---|---|
| 6,781,710 B1 * | 8/2004 | Simpson | G06F 3/1205 358/1.13 |
| 6,820,075 B2 | 11/2004 | Shanahan et al. | |
| 6,898,625 B2 | 5/2005 | Henry et al. | |
| 7,405,847 B2 | 7/2008 | Short et al. | |
| 8,078,975 B2 | 12/2011 | Sprague et al. | |
| 8,150,942 B2 | 4/2012 | Kindberg et al. | |
| 8,194,274 B2 | 6/2012 | Babbrah et al. | |

(Continued)

FOREIGN PATENT DOCUMENTS

EP 1603059 12/2005

OTHER PUBLICATIONS

Aura, T. et al., Scanning Electronic Documents for Personally Identifiable Information, (Research Paper) ~ WP °06, Oct. 30, 2006.

*Primary Examiner* — Christopher Wait
(74) *Attorney, Agent, or Firm* — Michael A. Dryja; Mannava & Kang (57) ABSTRACT

According to an example, print client based marking may include instructing a repository to store metadata related to a document. A machine-readable mark that includes an identification of a location of the metadata may be printed on the document.

15 Claims, 8 Drawing Sheets

(56) References Cited

U.S. PATENT DOCUMENTS

| | | |
|---|---|---|
| 2002/0176116 A1 | 11/2002 | Rhoads et al. |
| 2003/0028503 A1 | 2/2003 | Giuffrida et al. |
| 2005/0224571 A1* | 10/2005 | Kelley ................ G06F 17/2247 235/375 |
| 2010/0182631 A1 | 7/2010 | King et al. |
| 2010/0328726 A1* | 12/2010 | Babbrah .............. H04N 1/2179 358/1.18 |
| 2014/0085649 A1 | 3/2014 | Hohensee et al. |
| 2014/0211264 A1 | 7/2014 | Sirigiri et al. |

* cited by examiner

```
┌─────────────────────────────────────────────────────────────┐
│ RECEIVE METADATA RELATED TO A DOCUMENT TO BE PRINTED FROM AN│
│ APPLICATION BASED ON A PASSTHORUGH COMMAND TO PASS THE      │
│ METADATA TO THE PROCESSOR WITHOUT INTERCEPTION BY AN OPERATING│
│                           SYSTEM                            │
│                            602                              │
└─────────────────────────────────────────────────────────────┘
                              │
                              ▼
┌─────────────────────────────────────────────────────────────┐
│          INSTRUCT A REPOSITORY TO STORE THE METADATA        │
│                            604                              │
└─────────────────────────────────────────────────────────────┘
                              │
                              ▼
┌─────────────────────────────────────────────────────────────┐
│   GENERATE A MACHINE-READABLE MARK THAT INCLUDES AN         │
│   IDENTIFICATION OF A LOCATION OF THE STORED METADATA       │
│                            606                              │
└─────────────────────────────────────────────────────────────┘
                              │
                              ▼
┌─────────────────────────────────────────────────────────────┐
│    GENERATE AN ELECTRONIC VERSION OF THE DOCUMENT           │
│      THAT INCLUDES THE MACHINE-READABLE MARK                │
│                            608                              │
└─────────────────────────────────────────────────────────────┘
                              │
                              ▼
┌─────────────────────────────────────────────────────────────┐
│      INSTRUCT A PRINTING DEVICE TO PRINT THE                │
│    ELECTRONIC VERSION OF THE DOCUMENT TO                    │
│  GENERATE A PRINTED DOCUMENT THAT INCLUDES A                │
│       DISPLAY OF THE MACHINE-READABLE MARK                  │
│                            610                              │
└─────────────────────────────────────────────────────────────┘
```

PRINTED DOCUMENT INCLUDING MACHINE-READABLE MARK INCLUDING UNIQUE IDENTIFICATION UNDER WHICH METADATA FOR DOCUMENT IS STORED IN REPOSITORY

BACKGROUND

When printing a document, a user may enter print preferences related to the document in a pop-up dialog. For example, the user may enter text or information related to the document that is to be printed in the pop-up dialog. This information may then be used for print routing or for other workflows. The information that is printed on the document may include the contents of the document.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Printed documents may lack information to link an individual paper document to its electronic original, the situation that triggered the print, or even when the document was printed. For example, the information that is printed on the document may include the contents of the document. In certain cases, metadata related to the document may be entered by a user by using a pop-up dialog. In certain cases, the pop-up dialog may be initiated during printing of the document. Examples of such metadata include an author of the document, a document creation date, a document location, and generally, any information that is related to the document. Such metadata related to the document may be entered by a user, instead of being ascertained from an application and/or an operating system (OS) of a device that is used to initiate the printing, According to examples, a print client based marking engine and a method for print client based marking are disclosed herein. Generally, the engine and method disclosed herein may provide for the OS and, applications to pass metadata that is not part of a rendered document, but may be added as a machine-readable mark on the printed or displayed document, e.g., via a bar code (such as a QUICK RESPONSE (QR) code), steganography, micro text, magnetic inks, magnetic ink character recognition (MICR), and other such processes and codes. In some examples, the machine-readable mark may be represented in an encoded form that is not readily readable by a human, but readable by a computing device (e.g., a bar code reader (such as a QR code reader), a magnetic ink reader, etc.) to determine payload information (e.g., the metadata or information useable to access the metadata in a remote storage) encoded in the code of the machine-readable mark. The metadata may be derived from applications, and include information that is not generally added into a printed form of a document. For example, the metadata may include the author of a document, the file location of the document in the OS, the time of document printing, global positioning system (GPS) coordinates of a device that includes the engine to print the document, etc. If the metadata is derived from an application such as a content management system, the metadata may include, for example, information indicating individuals that have reviewed a document, whether the document is approved or not, etc.

In some examples, the engine may include certain functionalities of print drivers and/or print plugins. In some examples, the engine may be a print driver and/or a print plugin. With respect to UNIX systems for example, a printer driver may include machine readable instructions that convert the data to be printed to a form specific to a printer. With respect to ANDROID systems for example, a print plugin may perform similar functionalities of a print driver. With respect to the functionalities of print drivers and/or print plugins, the engine may operate as an adapter between the OS application programming interface (API) and a printing device.

In examples described herein, a metadata ticket that is related to a document may be passed to the engine, for example, when the document is to be printed. For example, the metadata ticket may be passed to the engine when an application generates instructions to print the document. The metadata ticket may include a collection of metadata. The metadata ticket may be stored in a metadata repository (e.g., a cloud database, or another type of database). The collection of metadata for the document may be accessed when the machine-readable mark is scanned, or the machine-readable mark may redirect a user to a uniform resource locator (URL) that indicates a location from which the collection of metadata may be obtained.

According to an example, print client based marking may include instructing a repository (e.g., a metadata repository) to store metadata related to a document to be printed, and generating a machine-readable mark that includes an identification of a location of the stored metadata. Print client based marking may further include generating an electronic version of the document that includes the machine-readable mark, and instructing a printing device (e.g., a printer) to print the electronic version of the document to generate a printed document that includes a display of the machine-readable mark.

Figure 1A:
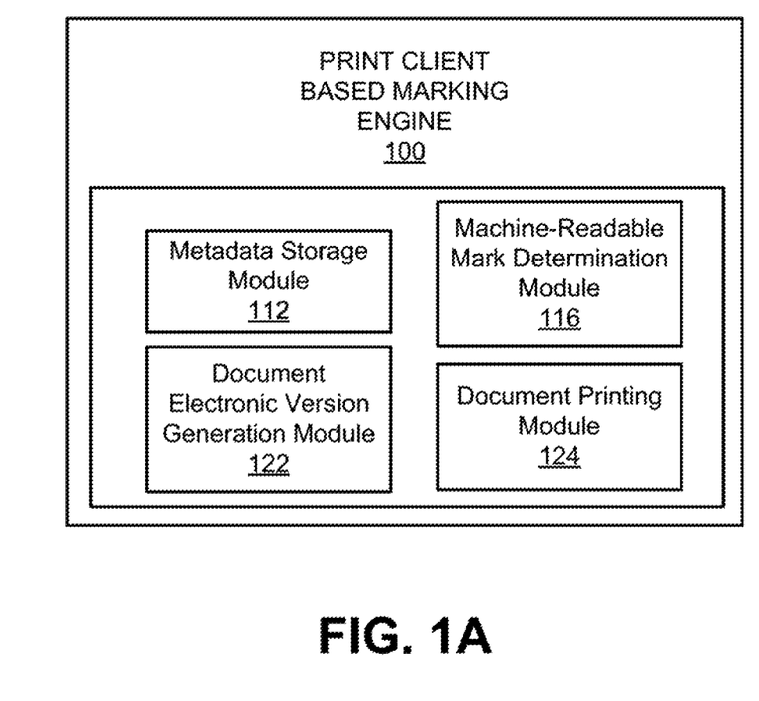
FIG. 1A illustrates an architecture of a print client based marking engine, according to an example of the present disclosure.
Figure 1B:
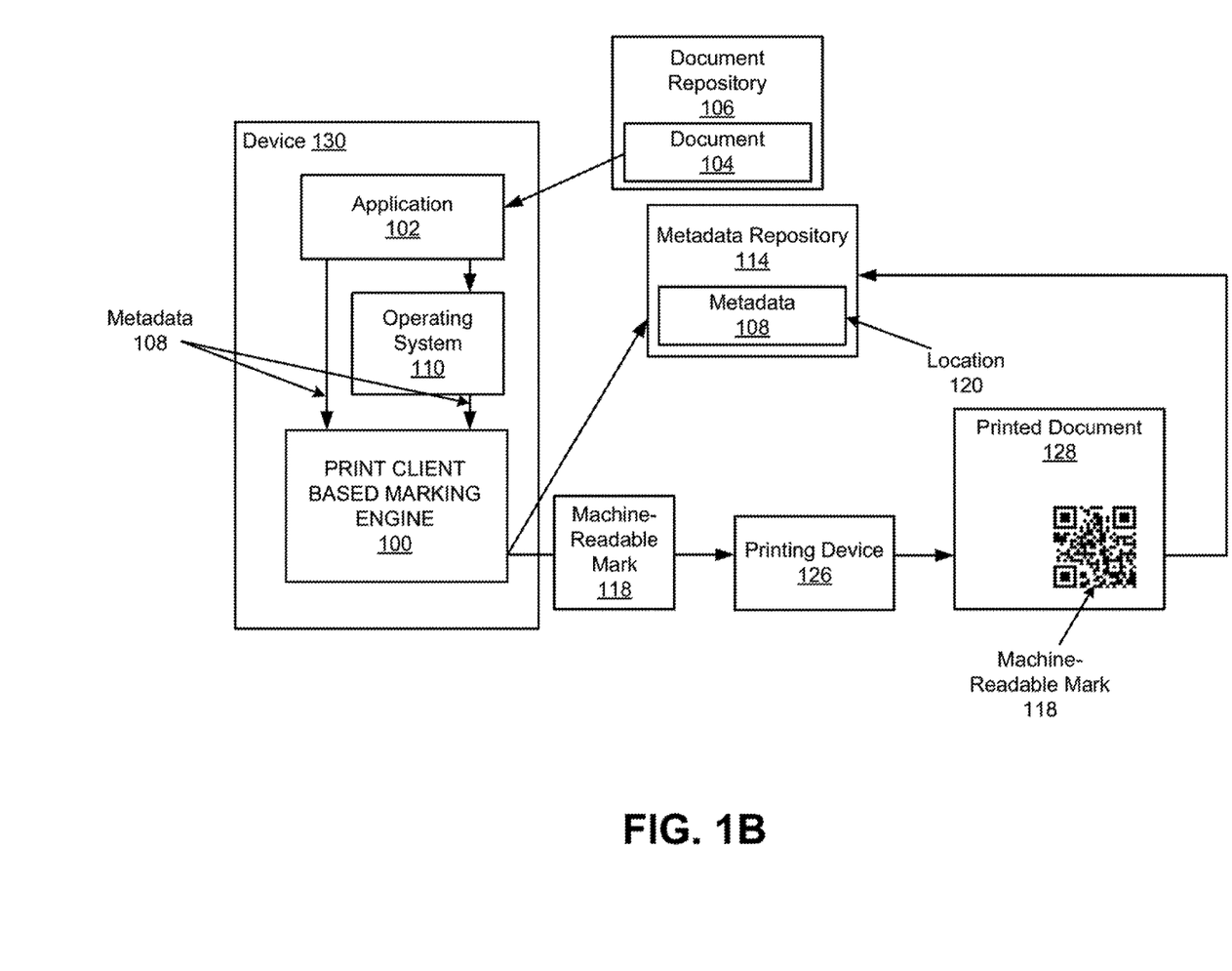
FIG. 1B illustrates an environment to illustrate operation of the print client based marking engine of FIG. 1A, according to an example of the present disclosure.

FIG. 1A illustrates an architecture of a print client based marking engine (hereinafter also referred to as "engine 100"), according to an example of the present disclosure. FIG. 1B illustrates an environment to illustrate operation of the engine 100, according to an example of the present disclosure. Referring to FIGS. 1A and 1B, the engine 100 may operate in conjunction with an application 102 to assess (e.g., retrieve, receive, or otherwise evaluate) a document 104 that is to be printed. The document 104 may be stored, for example, in a document repository 106. The document repository 106 may be a remote database, accessible to the engine 100 via at least one computer network (e.g., the Internet, etc.). For example, the document repository 106 may be a cloud database.

The engine 100 may assess metadata 108 related to the document 104. In some examples, the engine 100 may receive the metadata 108 from the application 102 and/or an OS 110 that is related to the engine 100.

A metadata storage module 112 of the engine 100 may instruct a metadata repository 114 to store the metadata 108 in the metadata repository 114.

A machine-readable mark determination module 116 of the engine 100 may determine (e.g., generate) a machine-readable mark 118 that includes an identification of a location 120 of the metadata 108 in the metadata repository 114.

A document electronic version generation module 122 of the engine 106 may generate an electronic version of the document 104 that includes the machine-readable mark 118.

A document printing module 124 of the engine 100 may instruct a printing device 126 to print the electronic version of the document 104 to generate a printed document 128 that includes a display of the machine-readable mark 118. The printing device 126 may be a printer that is used to generate a paper version of the printed document 128. In some examples, the document printing module 124 may instruct the printing device 126 to print the machine-readable mark 118 at a specified location on the printed document 128. The specified location may be a known location (e.g., a bottom right hand corner) that is used to scan the machine-readable mark 118.

In the example of FIGS. 1A and 1B, the engine 100 and the elements of the engine 100 may be any combination of hardware and programming to implement the functionalities of the engine. In examples described herein, such combinations of hardware and programming may be implemented in a number of different ways. For example, the programming for the engine 100 may be processor executable instructions stored on a non-transitory machine-readable storage medium and the hardware for the engine 100 may include a processing resource to execute those instructions. In such examples, the machine-readable storage medium may store instructions that, when executed by the processing resource, implement the engine 100. In such examples, engine 100 may include the machine-readable storage medium storing the instructions and the processing resource to execute the instructions, or the machine-readable storage medium may be separate but accessible to engine 100 and the processing resource. Further, the modules and other elements of the engine 100 may be machine readable instructions stored on a non-transitory computer readable medium. In addition, or alternatively, the modules and other elements of the engine 100 may be hardware or a combination of machine readable instructions and hardware.

Referring to FIG. 1A and 1B, the engine 100 may be implemented in a device 130 such as, for example, a phone, a personal computer (PC), etc. The engine 100 may be used by the OS 110 to interface with the printing device 126. The engine 100 may operate as an adapter between the OS API and the printing device 126. The engine 100 may include certain functionalities of print drivers and/or print plugins. In some examples, the engine 100 may be a print driver and/or a print plugin.

The engine 100 may ascertain the metadata 108 from the application 102, the OS 110 of the device 130, and/or another source that may access and/or generate the metadata 108. The engine 100 may also ascertain the metadata 108 from the document repository 106.

In an example illustrated in FIG. 1B, the application 102 may locate the document 104 that is to be printed from the document repository 106. The application 102 may open the document 104 and invoke operations to print the content of the document 104. The application 102 may use an OS provided print API to send print instructions to the printing device 126 via the engine 100.

The application 102 may be any general application that is developed to perform a predetermined function on the device 130. For example, the application 102 may be a spreadsheet, a word processor, a portable document format (PDF) reader or creator, etc. The application 102 that is used to print the document 104 may generate the metadata 108 that is generally not part of the document layout, but is related to information about the document 104. For example, the metadata 108 may include information such as the author of the document 104, changes that are made to the document 104, etc. For example, if the metadata is derived from an application such as a content management system (e.g., ATUTOR), the metadata may include, for example, information indicating individuals that have reviewed a document, whether the document is approved or not, etc.

In some examples, the metadata 108 may include information related to the author of the document 104, which authors have reviewed the document 104, changes to the document 104, the location of the device 130 (e.g., via a global positioning system (GPS) coordinate) from which the document 104 is printed, a URL associated with an original version of the document 104, the time of access and/or printing of the document 104, a device identification (ID) for the device 130 and/or the engine 100, etc.

The machine-readable mark 118 may include, for example, a QR code, or another type of machine-readable mark on the document 104 (i.e., a PDF or paper version of the printed document 128), and may encode the metadata 108 stored in the metadata repository 114 or an indication of the metadata location 120 into the printed document 128.

The machine-readable mark 118 may be placed on the document 104 at a location that does not interfere with the contents of the document For example, the machine-readable mark 118 may be placed at a corner of the document 104. Alternatively, the location of the machine-readable mark 118 may be determined based on the determination of a predetermined distance from the content of the document 104. The machine-readable mark 118 may also be implemented in a manner that is invisible to a user of the document 104. The machine-readable mark 118 may also be implemented in a PDF that is generated of the document 104, and further printed.

When a document is to be printed, the engine 100 may access the metadata 108 from the metadata repository 114 or determine the location of the stored metadata from the metadata repository 114. The engine 100 may encode the metadata 108 and/or its stored location to generate the machine-readable mark 118. Further, the engine 100 may place the machine-readable mark 118 on the document 104 when the document 104 is printed or displayed.

The machine-readable mark 118 may be scanned from the printed document 128 to access the metadata 108 that is stored in the metadata repository 114. For example, a bar code scanner may be used to scan the machine-readable mark 118 that is in the form of a bar code to access the metadata 108 that is stored in the metadata repository 114.

Figure 2:
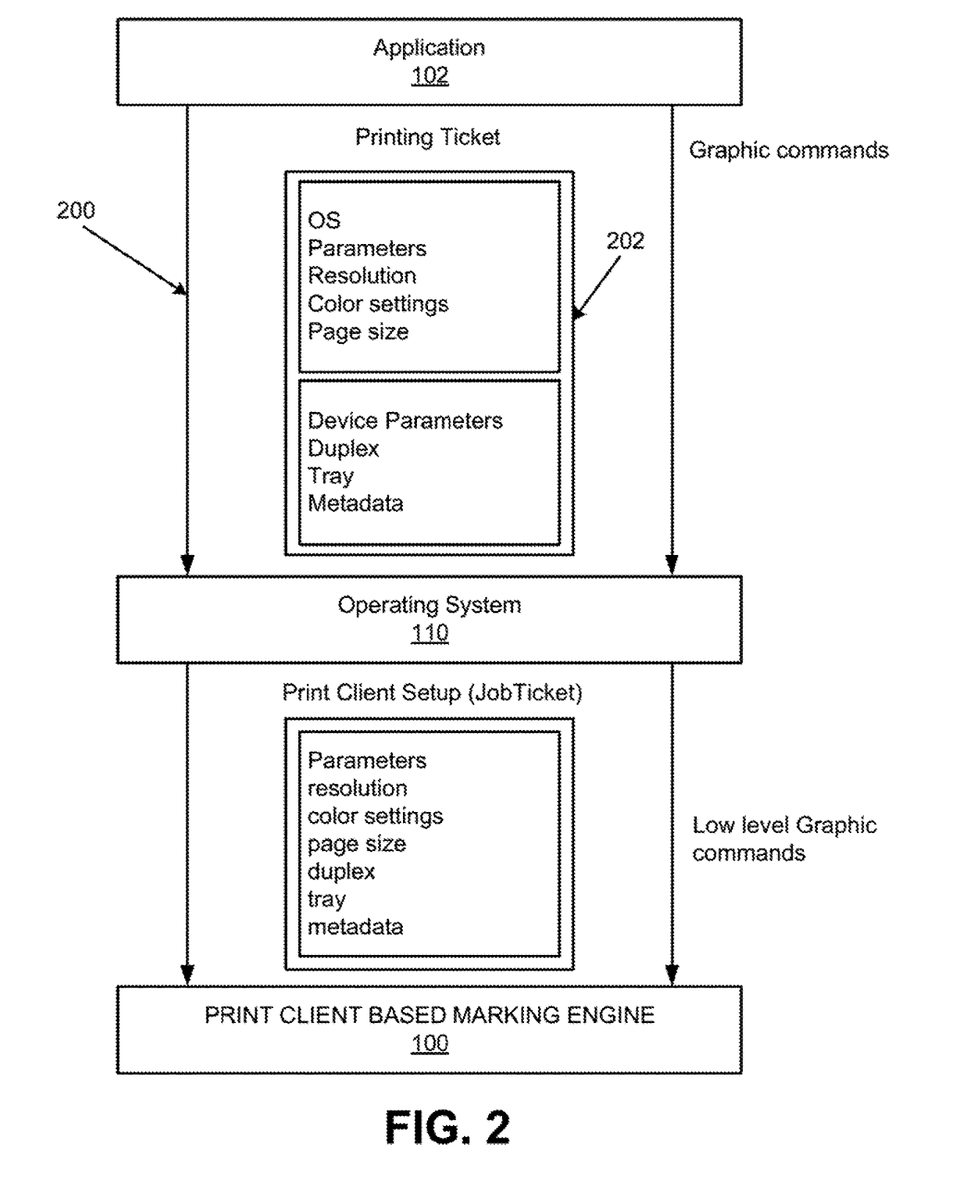
FIG. 2 illustrates implementation of an extension into the operating system (OS), according to an example of the present disclosure.
Figure 3:
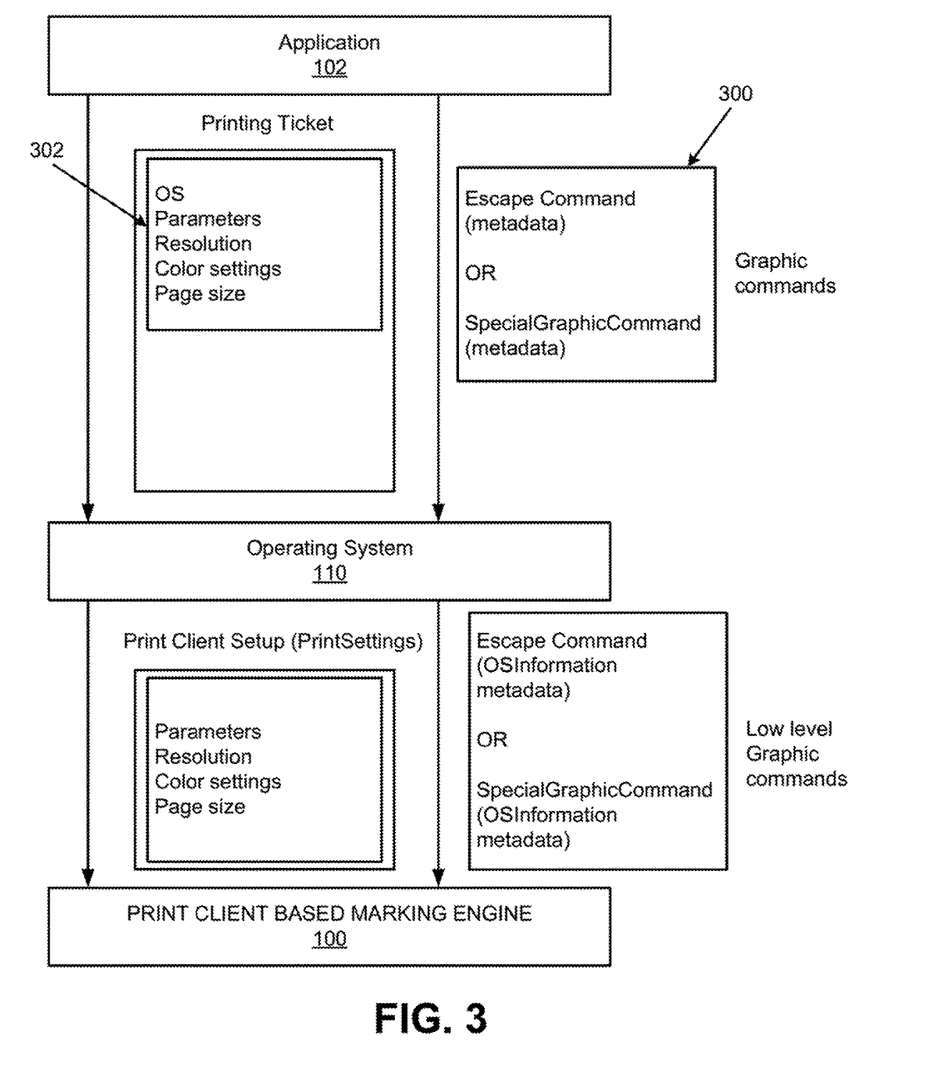
FIG. 3 illustrates a passthrough command for passing of custom data to the print client based marking engine of FIG. 1A according to an example of the present disclosure.

Various mechanisms may be used to provide for the application 102 to pass the metadata 108 to the engine 100. In this regard, FIG. 2 illustrates implementation of an extension into the OS 110, according to an example of the present disclosure. Referring to FIG. 2, the OS 110 may include the capability of allowing the application 102 to pass information (e.g., the metadata 108) to the engine 100. However, if the OS 110 does not include the capability of allowing the application 102 to pass information (e.g., the metadata 108) to the engine 100, an extension 200 may provide for the metadata 108 to be sent to the engine 100 via a printing ticket 202 submitted to the OS 110. The extension 200 may be described as machine readable instructions that provide for the metadata 108 to be sent to the engine 100 via the printing ticket 202 submitted to the OS 110. As shown in FIG. 2, the printing ticket 202 may include various configuration options related to printing of the document 104. For example, the printing ticket 202 may include various configuration options such as print parameters, print resolution, color settings, page size, printing device parameters, duplex, tray settings, etc. Further, the printing ticket 202 may include the metadata 108 related to the document 104, Another mechanism that may be used to provide for the application 102 to pass the metadata 108 to the engine 100 is described with reference to FIG. 3. FIG. 3 illustrates a passthrough command for passing of custom data to the engine 100, according to an example of the present disclosure. Generally, as illustrated in FIG. 3, a passthrough command 300 in the printing language (e, graphics device interface (GDI)) may provide for the application 102 to pass custom data without the OS intercepting the custom data. The custom data may include the metadata 108 that is passed to the engine 100 from the application 102 via the OS 110. For example, the passthrough command may include an escape command. Alternatively, the passthrough command may include a graphic command. As shown in FIG. 3, the printing ticket 302 may include various configuration options related to printing of the document 104. For example, the printing ticket 302 may include various configuration options such as the OS, print parameters, print resolution, color settings, page size, etc.

Figure 4:
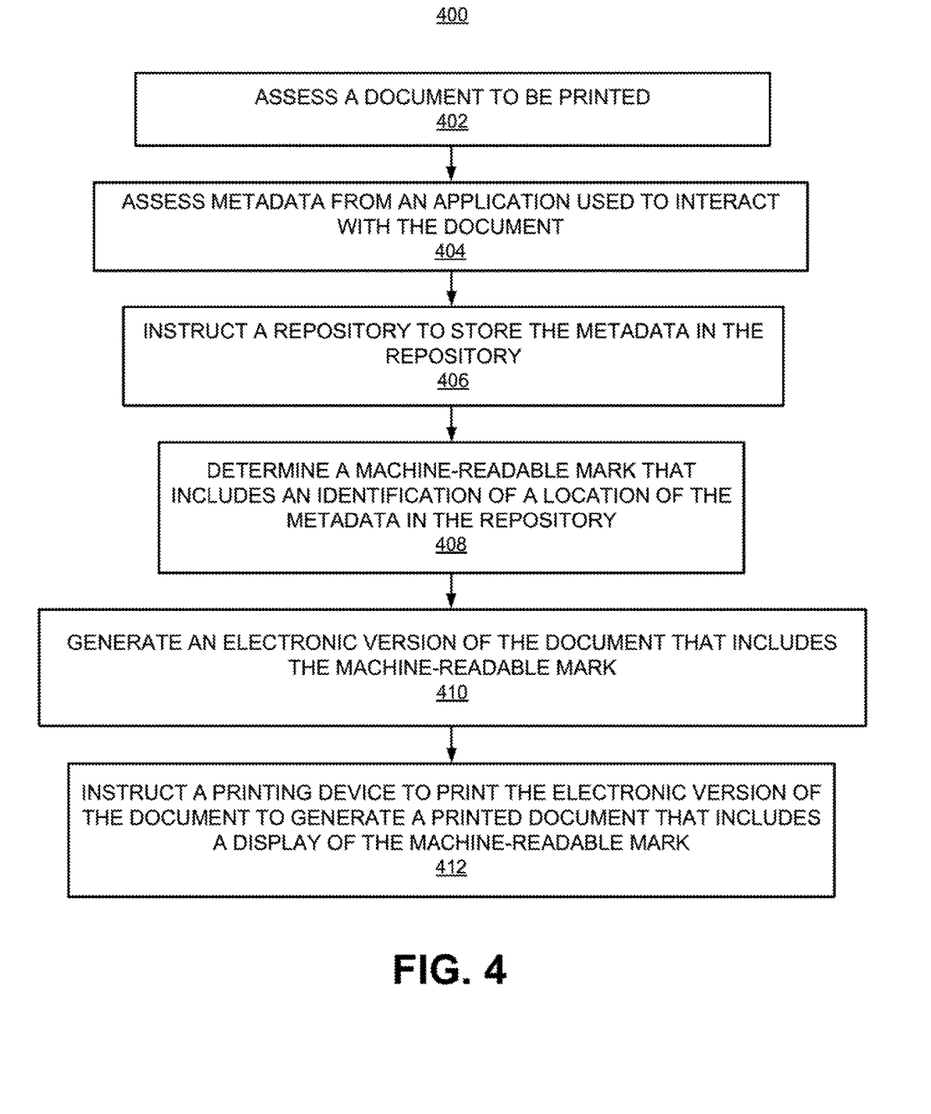
FIG. 4 illustrates a method for print client based marking, according to an example of the present disclosure.
Figure 5:
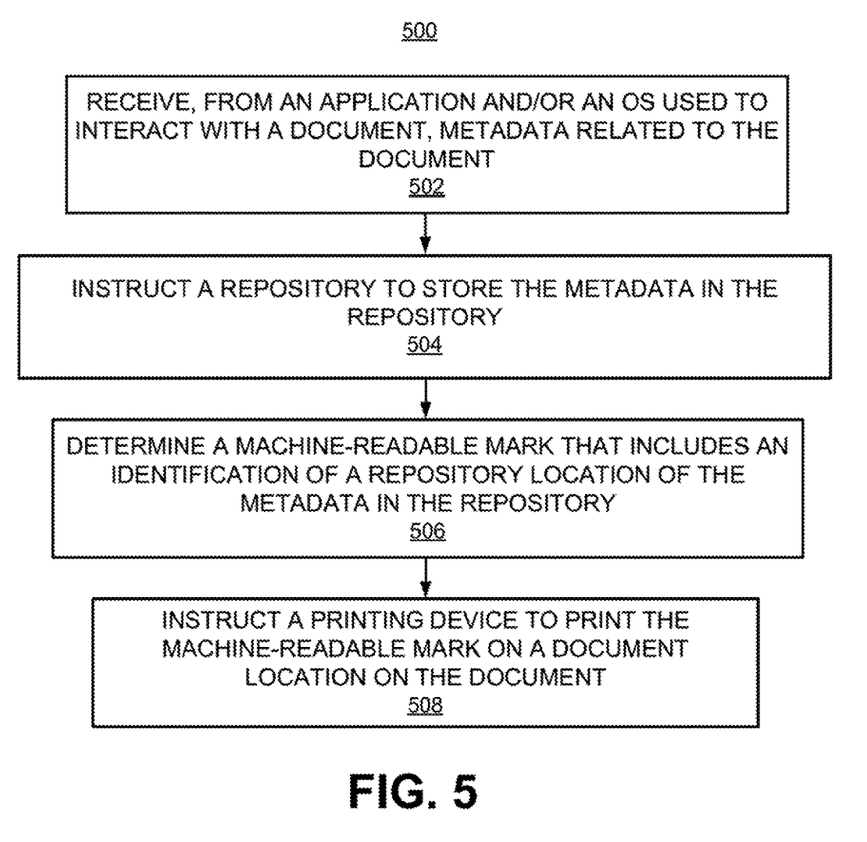
FIG. 5 illustrates further details of the method, for print client based marking, according to an example of the present disclosure.
Figure 6:
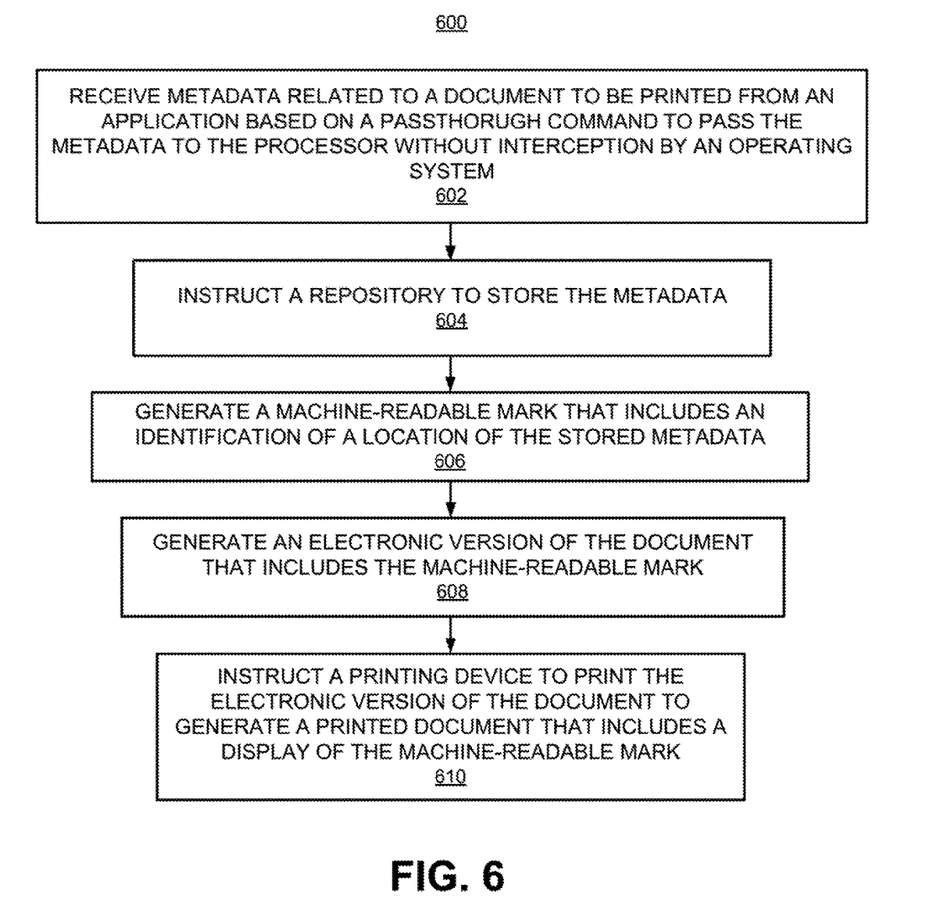
FIG. 6 illustrates further details of the method for print client based marking, according to an example of the present disclosure.

FIGS. 4-6 respectively illustrate flowcharts of methods 400, 500, and 600 for print client based marking, corresponding to the example of the print client based marking engine 100 whose construction is described in detail above. The methods 400, 500, and 600 may be implemented on the print client based marking engine 100 with reference to FIGS. 1A-3 by way of example and not limitation. The methods 400, 500, and 600 may be practiced in other engines.

Referring to FIG. 4, for the method 400, at block 402, the method may include assessing a document to be printed. For example, referring to FIGS. 1A-3, the engine 100 may operate in conjunction with the application 102 to assess (e.g., retrieve, receive, or otherwise evaluate) the document 104 that is to be printed.

At block 404, the method may include assessing metadata from an application used to interact with the document, where the metadata is related to the document. For example, referring to FIGS. 1A-3, the engine 100 may assess the metadata 108 from the application 102 used to interact with the document 104, where the metadata 108 is related to the document 104.

At block 406, the method may include instructing a repository to store the metadata in the repository. For example, referring to FIGS. 1A-3, the metadata storage module 112 of the engine 100 may send the metadata 108 and an instruction to store the metadata 108 to the metadata repository 114. For example, to store the metadata 108 in the metadata repository 114, the engine 100 may generate a unique identification (ID) for the metadata 108 for a particular document, and instruct the metadata repository 114 to store the metadata 108 under the unique ID. The unique ID may be a key field in a database if the metadata repository 114 includes a database. The unique ID may be generated by hashing the metadata 108 or by some other technique.

At block 408, the method may include determining a machine-readable mark that includes an identification of a location of the metadata in the repository. For example, referring to FIGS. 1A-3, the machine-readable mark determination module 116 of the engine 100 may determine (e.g., generate) a machine-readable mark 118 that includes an identification of the location 120 of the metadata 108 in the metadata repository 114. The location 120 may include an identifier of the metadata 108, such as the unique ID of the metadata 108 described at block 406. The unique ID may be encoded to generate the machine-readable mark 118. Additional information may be encoded to generate the machine-readable mark 118, such as the location or URL or another address of the metadata repository 114.

At block 410, the method may include generating an electronic version of the document that includes the machine-readable mark For example, referring to FIGS. 1A-3, the document electronic version generation module 122 may generate an electronic version of the document 104 that includes the machine-readable mark 118.

At block 412, the method may include instructing a printing device to print the electronic version of the document to generate a printed document that includes a display of the machine-readable mark. For example, referring to FIGS. 1A-3, the document printing module 124 of the engine 100 may instruct the printing device 126 to print the electronic version of the document 104 to generate the printed document 128 that includes a display of the machine-readable mark 118.

According to an example, with an extension into the OS related to a component that is to receive the metadata from the application, the method 400 may include passing the metadata to the component from the application. For example, referring to FIGS. 1A-3, with the extension 200 into the OS 110 related to the engine 100 (e,g., the component) that is to receive the metadata 108 from the application 102, the method 400 may include passing the metadata 108 to the engine 100 from the application 102 via the printing ticket 202 submitted to the OS 110.

According to an example, with a passthrough command to pass the metadata to a component that is to receive the metadata from the application without interception by an OS related to the component, the method 400 may include passing the metadata to the component from the application. For example, referring to FIGS. 1A-3, with the passthrough command 300 in the printing language (e.g., GDI) to pass the metadata 108 to the engine 100 that is to receive the metadata 108 from the application 102 without interception by the OS 110 related to the engine 100, the method 400 may include passing the metadata 108 to the engine 100 from the application 102.

Referring to FIG. 5, for the method 500, at block 502, the method may include receiving, from an application and/or an OS used to interact with a document, metadata related to the document. For example, referring to FIGS. 1A-3, the engine 100 may receive, from the application 102 and/or the OS 110 used to interact with a document 104 metadata 108 related to the document 104.

At block 504, the method may include instructing a repository to store the metadata in the repository. For example, referring to FIGS. 1A-3, the metadata storage module 112 of the engine 100 may instruct the metadata repository 114 to store the metadata 108 in the metadata repository 114.

At block 506, the method may include determining a machine-readable mark that includes an identification of a repository location of the metadata in the repository. For example, referring to FIGS. 1A-3, the machine-readable mark determination module 116 of the engine 100 may determine (e.g., generate) a machine-readable mark 118 that includes an identification of the location 120 of the metadata 108 in the metadata repository 114.

At block 508, the method may include instructing a printing device to print the machine-readable mark on a document location on the document. For example, referring to FIGS. 1A-3, the document printing module 124 of the engine 100 may instruct the printing device 126 to print the document 104 (i.e., to generate the printed document 128).

Referring to FIG. 6, for the method 600, at block 602, the method may include receiving metadata related to a document to be printed from an application based on a passthrough command to pass the metadata to the processor without interception by an OS. For example, referring to FIGS. 1A-3, the method may include receiving metadata 108 related to a document 104 to be printed from an application 102 based on the passthrough command 300 in the printing language (e.g., GDI) to pass the metadata 108 to the processor without interception by the OS 110.

At block 604, the method may include instructing a repository to store the metadata. For example, referring to FIGS. 1A-3, the metadata storage module 112 of the engine 100 may instruct the metadata repository 114 to store the metadata 108 in the metadata repository 114.

At block 606, the method may include generating a machine-readable mark that includes an identification of a location of the stored metadata. For example, referring to FIGS. 1A-3, the machine-readable mark determination module 116 of the engine 100 may determine (e.g., generate) a machine-readable mark 118 that includes an identification of the location 120 of the metadata 108 in the metadata repository 114.

At block 608, the method may include generating an electronic version of the document that includes the machine-readable mark. For example, referring to FIGS. 1A-3, the document electronic version generation module 122 of the engine 100 may generate an electronic version of the document 104 that includes the machine-readable mark 118.

At block 610, the method may include instructing a printing device to print the electronic version of the document to generate a printed document that includes a display of the machine-readable mark. For example, referring to FIGS. 1A-3, the document printing module 124 of the engine 100 may instruct the printing device 126 to print the electronic version of the document 104 to generate a printed document 128 that includes a display of the machine-readable mark 118.

Figure 7:
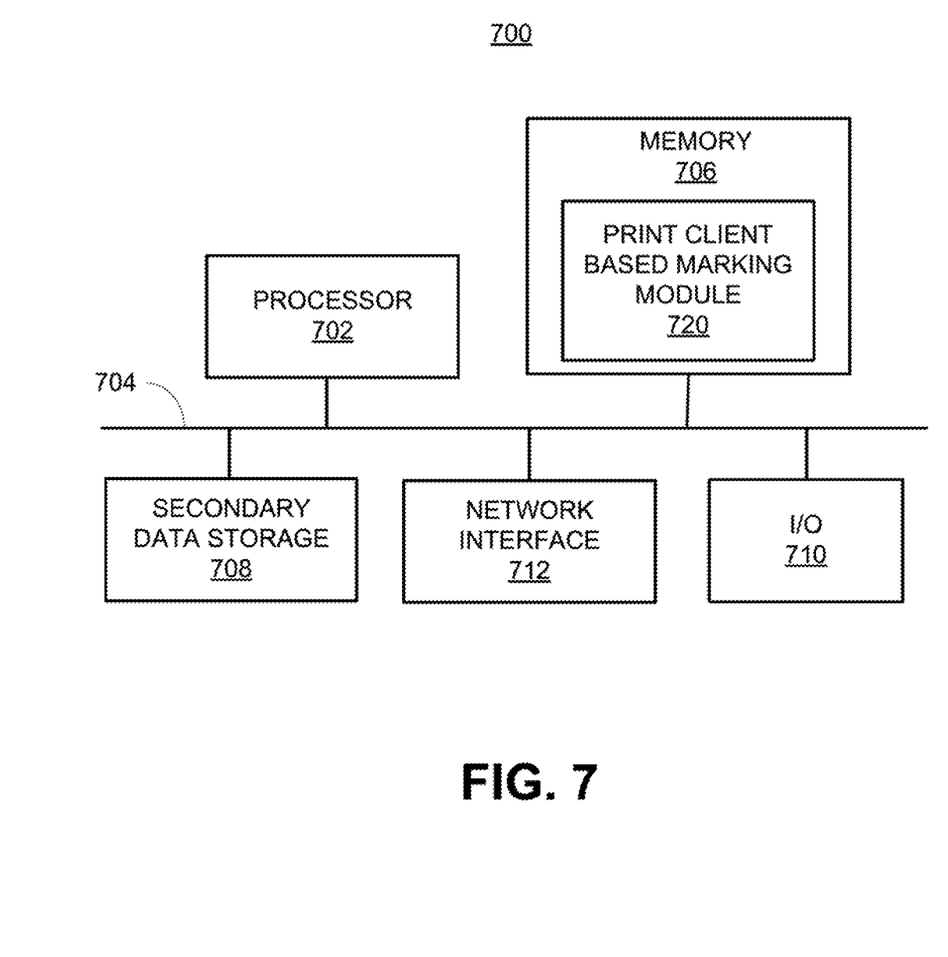
FIG. 7 illustrates a computer system, according to an example of the present disclosure.

FIG. 7 shows a computer system 700 that may be used with the examples described herein. The computer system 700 may represent a generic platform that includes components that may be in a server or another computer system. The computer system 700 may be used as a platform for the engine 100. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 700 may include a processor 702 that may implement or execute machine readable instructions performing some or all of the methods, functions and other processes described herein. Commands and data from the processor 702 may be communicated over a communication bus 704. The computer system may also include a main memory 706, such as a random access memory (RAM), where the machine readable instructions and data for the processor 702 may reside during runtime, and a secondary data storage 708, which may be non-volatile and stores machine readable instructions and data. The memory and data storage are examples of computer readable mediums. The memory 706 may include a print client based marking module 720 including machine readable instructions residing in the memory 706 during runtime and executed by the processor 702. The print client based marking module 720 may include the modules of the engine 100 shown in FIG. 1A and 1B.

The computer system 700 may include an I/O device 710, such as a keyboard, a mouse, a display, etc. The computer system may include a network interface 712 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for print client based marking, the method comprising:
   assessing, by a processor, a document to be printed;
   assessing metadata from an application used to interact with the document, wherein the metadata is related to the document;
   generating a unique identification for the metadata;
   sending, to a repository, the metadata, the unique identification for the metadata, and an instruction to store the metadata in the repository under the unique identification;

determining a machine-readable mark that includes a location address of the repository and the unique identification under which the metadata is stored in the repository;

generating an electronic version of the document that includes the machine-readable mark that includes the location address of the repository and the unique identification under which the metadata is stored in the repository; and instructing a printing device to print the electronic version of the document to generate a printed document that includes a display of the machine-readable mark that includes the location address of the repository and the unique identification under which the metadata is stored in the repository.

2. The method of claim 1, further comprising:

with an extension into an operating system (OS) related to a component that is to receive the metadata from the application, passing the metadata to the component from the application.

3. The method of claim 1, wherein the machine-readable mark includes a bar code that is scannable by a bar code scanner to determine the metadata from the location in the repository.

4. The method of claim 1, further comprising:

with a passthrough command to pass the metadata to a component that is to receive the metadata from the application without interception by an operating system (OS) related to the component, passing the metadata to the component from the application.

5. The method of claim 1, wherein the metadata includes at least one of:

information related to an author of the document, and a geographical location of a component that is to receive the metadata from the application.

6. The method of claim 1, further comprising:

assessing further metadata from an operating system (OS), wherein the further metadata is related to an operation of the OS with respect to the document.

7. A print client based marking engine comprising:

a processor; and a memory storing machine readable instructions that when executed by the processor cause the processor to:

receive metadata related to a document to be printed from an application based on a passthrough command to pass the metadata to the processor without interception by an operating system (OS);

send, to a repository, the metadata, the unique identification for the metadata, and an instruction to store the metadata in the repository under the unique identification;

generate a machine-readable mark that includes a location address of the repository and the unique identification under which the metadata is stored in the repository;

generate an electronic version of the document that includes the machine-readable mark that includes the location address of the repository and the unique identification under which the metadata is stored in the repository; and instruct a printing device to print the electronic version of the document to generate a printed document that includes a display of the machine-readable mark that includes the location address of the repository and the unique identification under which the metadata is stored in the repository.

8. The print client based marking engine according to claim 7, wherein the machine-readable mark includes a stenographic code, micro text, or magnetic ink that is scannable to determine the metadata from the location.

9. The print client based marking engine according to claim 7, further comprising machine readable instructions to:

with an extension into the OS, pass the metadata to the processor from the application.

10. The print client based marking engine according to claim 7, further comprising machine readable instructions to:

receive further metadata from the OS, wherein the further metadata is related to an operation of the OS with respect to the document.

11. A non-transitory computer readable medium having stored thereon machine readable instructions to provide print client based marking, the machine readable instructions, when executed, cause a processor to:

receive, from at least one of an application and an operating system (OS) used to interact with a document, metadata related to the document;

send, to a repository, the metadata, the unique identification for the metadata, and an instruction to store the metadata in the repository under the unique identification;

determine a machine-readable mark that includes a location address of the repository and the unique identification under which the metadata is stored in the repository; and instruct a printing device to print the machine-readable mark on a document location on the document, the machine-readable mark including the location address of the repository and the unique identification under which the metadata is stored in the repository.

12. The non-transitory computer readable medium according to claim 11, wherein the metadata includes information related to changes to the document.

13. The non-transitory computer readable medium according to claim 11, wherein the metadata includes an identification of a component that is used to access the document.

14. The non-transitory computer readable medium according to claim 11, further comprising machine readable instructions to:

with an extension into the OS, pass the metadata to a component that is to receive the metadata from the at least one of the application and the OS.

15. The non-transitory computer readable medium according to claim 11, further comprising machine readable instructions to:

with a passthrough command to pass the metadata to a component that is to receive the metadata from the at least one of the application and the OS without interception by the OS if the metadata is received from the application, pass the metadata to the component from the application.

* * * * *

UNITED STATES PATENT AND TRADEMARK OFFICE
CERTIFICATE OF CORRECTION

PATENT NO. : 10,296,272 B2  
APPLICATION NO. : 15/521861  
DATED : May 21, 2019  
INVENTOR(S) : Galo Gimenez Palop et al.

Page 1 of 1

It is certified that error appears in the above-identified patent and that said Letters Patent is hereby corrected as shown below:

On the Title Page

In Column 1, item (71), Applicant, Line 2, after "Company," insert -- L.P., --.

Signed and Sealed this  
Nineteenth Day of November, 2019

Andrei Iancu  
*Director of the United States Patent and Trademark Office*